(12) United States Patent
Matsumoto et al.

(10) Patent No.: US 11,870,208 B2
(45) Date of Patent: Jan. 9, 2024

(54) OPTICAL FIBER AMPLIFIER, OPTICAL FIBER AMPLIFIER CONTROL METHOD, AND TRANSMISSION SYSTEM

(71) Applicant: NEC Corporation, Tokyo (JP)

(72) Inventors: Keiichi Matsumoto, Tokyo (JP); Emmanuel Le Taillandier De Gabory, Tokyo (JP); Shigeyuki Yanagimachi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 641 days.

(21) Appl. No.: 16/976,162

(22) PCT Filed: Mar. 6, 2019

(86) PCT No.: PCT/JP2019/008751
§ 371 (c)(1),
(2) Date: Aug. 27, 2020

(87) PCT Pub. No.: WO2019/172292
PCT Pub. Date: Sep. 12, 2019

(65) Prior Publication Data
US 2020/0412079 A1   Dec. 31, 2020

(30) Foreign Application Priority Data
Mar. 9, 2018 (JP) .................................. 2018-042743

(51) Int. Cl.
*H01S 3/091* (2006.01)
*H01S 3/067* (2006.01)
(Continued)

(52) U.S. Cl.
CPC ........ *H01S 3/0912* (2013.01); *H01S 3/06754* (2013.01); *H01S 3/0941* (2013.01);
(Continued)

(58) Field of Classification Search
None
See application file for complete search history.

(56) References Cited

U.S. PATENT DOCUMENTS

| 6,055,092 A | 4/2000 | Sugaya et al. |
| 6,452,716 B1 | 9/2002 | Park et al. |

(Continued)

FOREIGN PATENT DOCUMENTS

| EP | 2101426 A1 | 9/2009 |
| JP | H04-361583 A | 12/1992 |

(Continued)

OTHER PUBLICATIONS

International Search Report corresponding to PCT/JP2019/008751, 2 pages, dated Jun. 4, 2019.

(Continued)

*Primary Examiner* — Eric L Bolda

(57) ABSTRACT

Provided are a low-cost and low power-consumption optical fiber amplifier, an optical fiber amplifier control method, and a transmission system. The optical fiber amplifier comprises: an optical fiber to which pumping light is supplied and which amplifies an optical signal, the optical fiber including a plurality of cores in a cladding; a light source which outputs the pumping light; a combining means which supplies the pumping light from the light source to the cladding of the optical fiber and causes the pumping light to be combined with the optical signal; a collect means which collects, without collecting the signal light, pumping light among the supplied pumping light that has not been absorbed by the optical fiber; a monitor means which monitors residual pumping light that has passed through the optical fiber and collected by the collect means; and a control means which controls the state of the pumping light.

11 Claims, 12 Drawing Sheets

(51) Int. Cl.
*H01S 3/094* (2006.01)
*H01S 3/0941* (2006.01)

(52) U.S. Cl.
CPC .. *H01S 3/094007* (2013.01); *H01S 3/094015* (2013.01); *H01S 3/06737* (2013.01)

(56) References Cited

U.S. PATENT DOCUMENTS

| | | | |
|---|---|---|---|
| 7,460,298 | B2 | 12/2008 | Li et al. |
| 2004/0257643 | A1* | 12/2004 | Chen .................. H01S 3/13013 359/341.4 |
| 2008/0198445 | A1* | 8/2008 | Murison ............... H01S 3/1301 359/337.13 |
| 2011/0085230 | A1 | 4/2011 | Rapp et al. |
| 2015/0085352 | A1* | 3/2015 | Ryf .................... H01S 3/06758 359/341.1 |

FOREIGN PATENT DOCUMENTS

| | | |
|---|---|---|
| JP | H05-291676 A | 11/1993 |
| JP | H06-164021 A | 6/1994 |
| JP | H08-248455 A | 9/1996 |
| JP | 2004-510395 A | 4/2004 |
| JP | 2006-012979 A | 1/2006 |
| JP | 2014-099453 A | 5/2014 |
| JP | 2016-127241 A | 7/2016 |
| JP | 2016-219753 A | 12/2016 |
| WO | WO-2002/030016 A2 | 4/2002 |
| WO | WO-2009/112504 A1 | 9/2009 |
| WO | WO-2017183061 A1 * | 10/2017 ......... H01S 3/06737 |

OTHER PUBLICATIONS

Written Opinion corresponding to PCT/JP2019/008751 with English translation, dated Jun. 4, 2019, 12 pages.

* cited by examiner

OPTICAL FIBER AMPLIFIER, OPTICAL FIBER AMPLIFIER CONTROL METHOD, AND TRANSMISSION SYSTEM

CROSS-REFERENCE TO RELATED APPLICATIONS

This application is a national stage application of International Application No. PCT/JP2019/008751 entitled "OPTICAL FIBER AMPLIFIER, OPTICAL FIBER AMPLIFIER CONTROL METHOD, AND TRANSMISSION SYSTEM," filed on Mar.6, 2019, which claims the benefit of the priority of Japanese Patent Application No. JP2018-042743 filed on Mar. 9, 2018, the disclosures of each of which are hereby incorporated by reference in their entirety.

TECHNICAL FIELD

The present invention relates to an optical fiber amplifier that amplifies a signal intensity of an optical signal, a control method for the optical fiber amplifier, and a transmission system, and more specifically, relates to reduction of power consumption of the optical fiber amplifier.

BACKGROUND ART

As an optical fiber amplifier that amplifies a signal intensity of an optical signal, there is an optical fiber amplifier that inputs pumping light being output from a pumping light source to a rare-earth-ion-doped fiber to which an optical signal is input, and thereby amplifies a signal intensity of the optical signal.

Such an optical fiber amplifier achieves high efficiency and a high gain with a gain being substantially polarization-independent, and therefore is used as an amplifier for relaying an optical signal in an optical fiber communication system.

Patent Literature 1 (PTL1) relates to an optical fiber amplifier, and proposes that an amplification multicore fiber that is constituted by using a double clad structure and includes a plurality of cores doped with erbium ions is used. Patent Literature 1 (PTL2) relates to a monitoring method for an optical amplifier that monitors an operation state of the optical amplifier, and proposes that pumping light transmitted without being absorbed by an erbium-doped fiber is monitored and thereby an operation state of the optical amplifier is monitored.

CITATION LIST

Patent Literature

[PTL1] Japanese Patent Application Laid-Open No. 2016-219753
[PTL2] Japanese Patent Application Laid-Open No. H06-164021

SUMMARY OF INVENTION

Technical Problem

A general optical fiber amplifier includes an optical fiber doped with rare earth ions. An optical fiber communication system using a general optical fiber amplifier takes an important role in speeding-up and capacity enlargement of communication. In order to cope with an increase in communication capacity, a related technique of wavelength multiplexing is actively developed.

In order to efficiently operate an optical fiber amplifier over a long term, a method of varying a "band used in signal transmission", based on wavelength multiplexing according to a variation of traffic, is employed. In this manner, a "band used in signal transmission" varies according to a variation of traffic after operation start.

When a "band used in signal transmission" varies, it is also necessary to vary pumping-light output according to the variation. In a wide band, an operation is performed at high output, and in a narrow band, an operation is performed at low output. When a band is fixed, output is maintained to be constant. Automatic power control or automatic gain control is exemplified. In this manner, it is necessary for a pumping light source to operate in such a way as to change an output level according to a change in band, and when a band does not fluctuate, to operate in such a way as to maintain an output level at a certain level.

An object of the present invention is to provide a low-cost and low-power-consumption optical fiber amplifier, a control method for the optical fiber amplifier, and a transmission system.

Solution to Problem

In order to achieve the object, an optical fiber amplifier according to the present invention includes: an optical fiber that is supplied with pumping light, amplifies an optical signal, and includes a plurality of cores in a clad; a light source that outputs the pumping light; a combining means for supplying the pumping light from the light source to the clad in the optical fiber and causing the pumping light to be combined with the optical signal; a collect means for collecting, among the pumping light, pumping light having not been absorbed by the optical fiber, without collecting the signal light; a monitor means for monitoring residual pumping light collected by the collect means and having passed through the optical fiber; and a control means for controlling a state of the pumping light.

A transmission system according to the present invention includes an optical fiber and the above-described optical fiber amplifier connected to the optical fiber.

A control method for an optical fiber amplifier according to the present invention includes:
supplying pumping light from a light source to a clad in an optical fiber that is supplied with pumping light, amplifies an optical signal, and includes a plurality of cores in the clad, and thereby causing the pumping light to be combined with the optical signal;
collecting, among the pumping light, pumping light having not been absorbed by the optical fiber, without collecting the signal light;
monitoring residual pumping light collected and having passed through the optical fiber; and
controlling a state of the pumping light according to a monitoring result.

Advantageous Effects of Invention

The present invention is able to provide a low-cost and low-power-consumption optical fiber amplifier, a control method for the optical fiber amplifier, and a transmission system.

EXAMPLE EMBODIMENT

Desirable example embodiments of the present invention are described in detail with reference to the drawings. According to the example embodiments, a "band used in signal transmission" may be simply referred to as a band. A "band used in signal transmission" may be referred to as a spectrum, a required band, a signal use rate of wavelength division multiplexing (WDM), or a wavelength filling rate.

Figure 1:
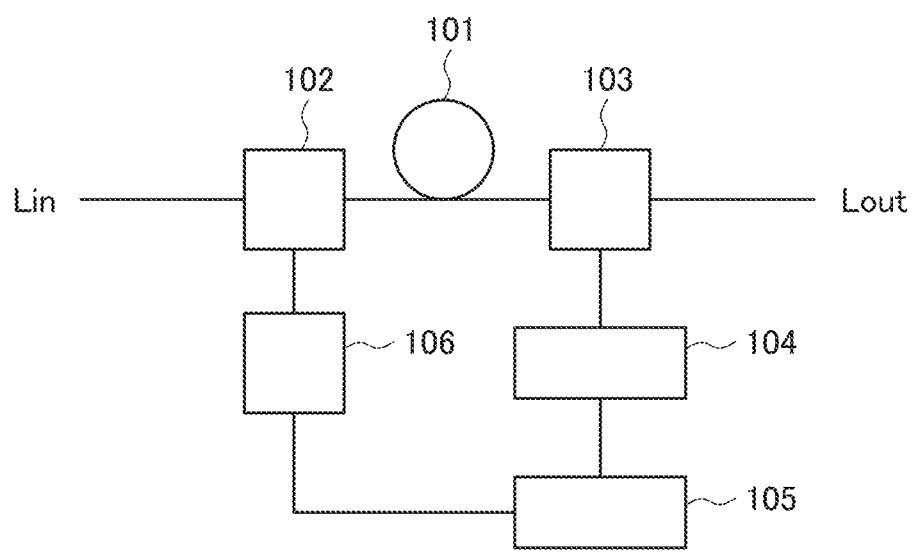
FIG. 1 is a configuration diagram for describing an optical fiber amplifier according to an example embodiment of a superordinate concept.

Before describing specific example embodiments, an optical fiber amplifier according to an example embodiment of a superordinate concept is described. FIG. 1 is a configuration diagram for describing the optical fiber amplifier according to the example embodiment of the superordinate concept.

The optical fiber amplifier in FIG. 1 includes: an optical fiber 101 that is supplied with pumping light, amplifies an optical signal, and includes a plurality of cores in a clad; and a light source 106 that outputs the pumping light. The optical fiber amplifier in FIG. 1 further includes a combining means 102 for supplying the pumping light from the light source 106 to the clad in the optical fiber and causing the pumping light to be combined with the optical signal, and a collect means 103 for collecting, among the pumping light, pumping light having not been absorbed by the optical fiber 101, without collecting the signal light. The optical fiber amplifier in FIG. 1 further includes a monitor means 104 for monitoring residual pumping light collected by the collect means 103 and having passed through the optical fiber, and a control means 105 for controlling a state of the pumping light.

In the optical fiber amplifier in FIG. 1, the optical fiber 101 that is supplied with pumping light and amplifies an optical signal includes a plurality of cores in a clad. The combining means 102 supplies the pumping light from the light source 106 to the clad in the optical fiber and pumping lights the pumping light to be combined with the optical signal. Thereby, pumping light is collectively combined with optical signals passing through a plurality of cores in a clad. According to the present example embodiment, a low-cost and low-power-consumption optical fiber amplifier, a control method of the optical fiber amplifier, and a transmission system can be provided. Hereinafter, more specific example embodiments are described.

First Example Embodiment

Figure 2:
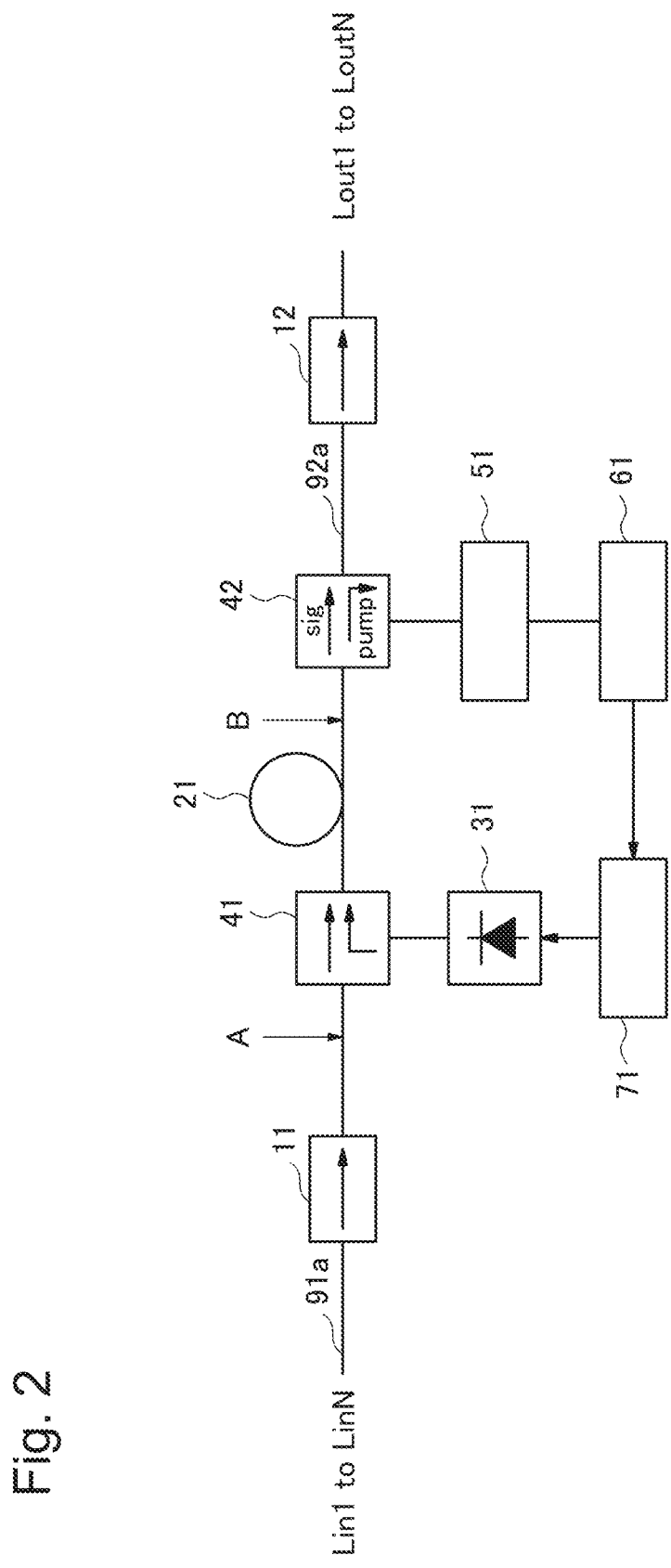
FIG. 2 is a configuration diagram for describing an optical fiber amplifier according to a first example embodiment.

Next, an optical fiber amplifier, a control method of the optical fiber amplifier, and a transmission system according to a first example embodiment of the present invention are described. FIG. 2 is a configuration diagram of the optical fiber amplifier according to the first example embodiment.

The optical fiber amplifier in FIG. 2 includes a multicore optical fiber 21 that is inserted between an optical fiber 91a and an optical fiber 92a as one example of an optical transmission path and includes a plurality of cores in one optical fiber, an optical multiplexer 41 relevant to the multicore optical fiber 21, and an optical splitting unit 42 relevant to the multicore optical fiber 21. The optical fiber amplifier in FIG. 2 further includes a pumping light source 31, a light-source drive circuit 71, a light-source-drive-circuit control device 61, and a pumping light intensity monitor 51. The optical fiber amplifier in FIG. 2 further includes an optical isolator 11 that restricts a propagation direction of an optical signal to a certain direction, and an optical isolator 12 that restricts a propagation direction of an optical signal to a certain direction.

The multicore optical fiber 21 is an optical fiber that includes a plurality of cores in one optical fiber and a clad in a periphery of the plurality of cores and is doped with rare earth ions. Herein, a case where the multicore optical fiber 21 is doped with erbium ions is described as an example. Description is made, assuming that a range from a position A to a position B illustrated in FIG. 2 is doped with erbium ions.

The pumping light source 31 outputs pumping light, and the optical multiplexer 41 multiplexes the pumping light with the multicore optical fiber 21. The optical splitting unit 42 splits a part of residual pumping light, and the pumping light intensity monitor 51 monitors the split pumping light. The light-source-drive-circuit control device 61 controls the light-source drive circuit 71, and the light-source drive circuit 71 drives the pumping light source 31.

When passing through the multicore optical fiber 21 doped with erbium ions, optical signals Lin1 to LinN are optically amplified by pumping light supplied from the optical multiplexer 41. According to the present example embodiment, the optical multiplexer 41 causes pumping light to be collectively combined with optical signals Lin1 to LinN passing through N cores. Specifically, the optical multiplexer 41 inputs pumping light to a clad in a periphery of a plurality of cores of the multicore optical fiber 21 and thereby causes the pumping light to be collectively combined with optical signals Lin1 to LinN passing through N cores. Hereinafter, the present method is referred to as a "clad-collective pumping method".

The optical splitting unit 42 demultiplexes, among pumping-light output by the pumping light source 31, residual pumping light having not been absorbed by the multicore optical fiber 21 and having not been used for signal light amplification, from the multicore optical fiber 21. The optical splitting unit 42 may include, as a demultiplexer, for example, a dichroic mirror that transmits signal light and reflects pumping light. However, a demultiplexer for demultiplexing a pumping-light output from the multicore optical fiber 21 may be a means other than a dichroic mirror.

The pumping light intensity monitor 51 is capable of monitoring a wavelength of pumping light, and includes, for example, a photo-diode having high photoelectric conversion efficiency at a wavelength band periphery of pumping light. However, a sensor for monitoring an intensity of residual pumping light may be a sensor other than a photo-diode. The pumping light intensity monitor 51 notifies the light-source-drive-circuit control device 61 of an output intensity of pumping light, as a monitoring result.

The pumping light source 31 is achieved, for example, by a semiconductor laser diode. The light-source-drive-circuit control device 61 and the light-source drive circuit 71 are each achieved by a dedicated processor.

(Description of an Operation)

Next, an example of an operation of the optical fiber amplifier according to the first example embodiment is described. When passing through the multicore optical fiber 21 via the optical isolator 11, beams of input light Lin1 to LinN are optically amplified by pumping light supplied from the optical multiplexer 41, and are output as output light Lout via the optical isolator 12. Pumping light having not been used for optical amplification in the multicore optical fiber 21 is collected from the optical splitting unit 42, as residual pumping light, and is monitored in the pumping light intensity monitor 51. The light-source-drive-circuit control device 61 controls the light-source drive circuit 71, based on a monitor value. According to the present example embodiment, a state of pumping light can be controlled while a loss of signal light is reduced.

According to the present example embodiment, pumping light propagating in the clad of the multicore optical fiber 21 is collected based on the clad-collective pumping method, and therefore pumping light having a sufficient intensity as a monitor value can be collected.

In a method of collecting pumping light propagating in a core, it is assumable that an intensity of collectable pumping light is weak and a feedback to a control means is not provided. In a method of collecting pumping light propagating in a core, a part of signal light may be simultaneously collected when pumping light propagating in the core is collected, depending on a wavelength of the pumping light. When such collect of signal light occurs, quality degradation occurs in signal light output by an optical fiber amplifier.

In contrast, according to the present example embodiment, pumping light propagating in the clad of the multicore optical fiber 21 is collected based on the clad-collective pumping method, and therefore quality degradation of signal light output by the optical fiber amplifier can be prevented from occurring.

Figure 10:
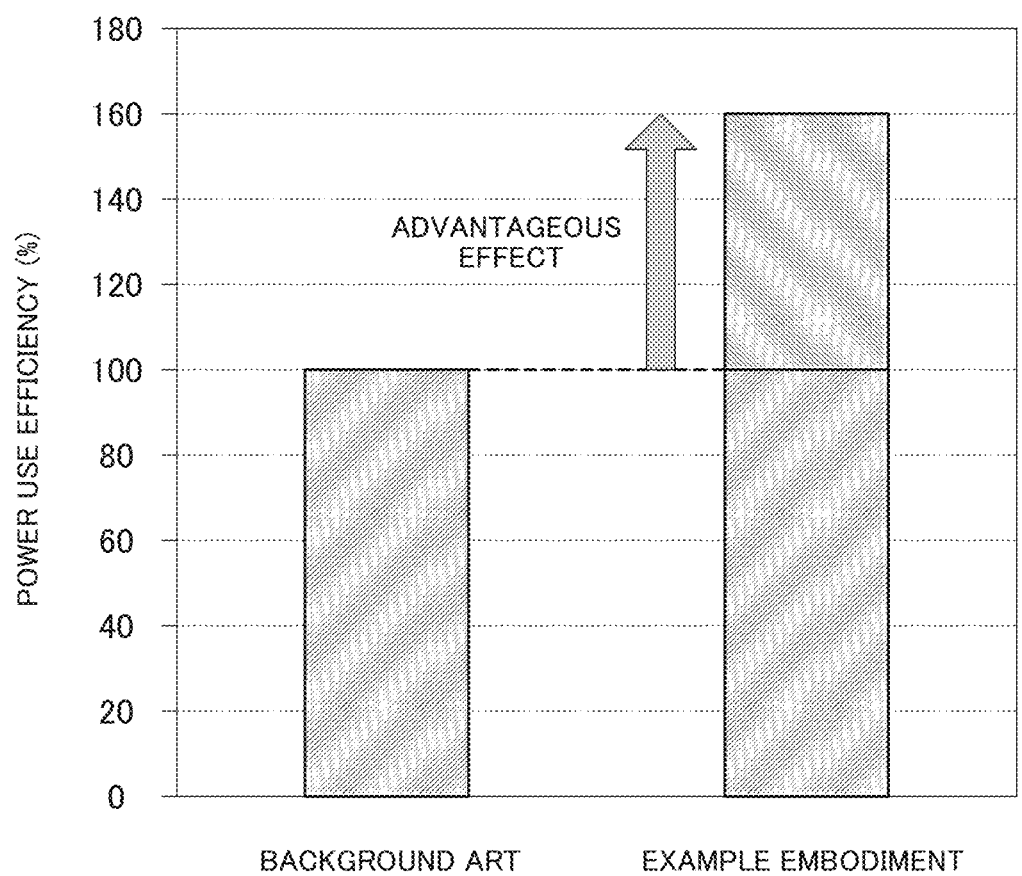
FIG. 10 is a graph describing an advantageous effect of increasing power use efficiency according to an example embodiment.

An advantageous effect of increasing power use efficiency according to the present example embodiment is illustrated in FIG. 10. In this manner, an optical fiber amplifier having high power use efficiency can be achieved.

Second Example Embodiment

Figure 3:
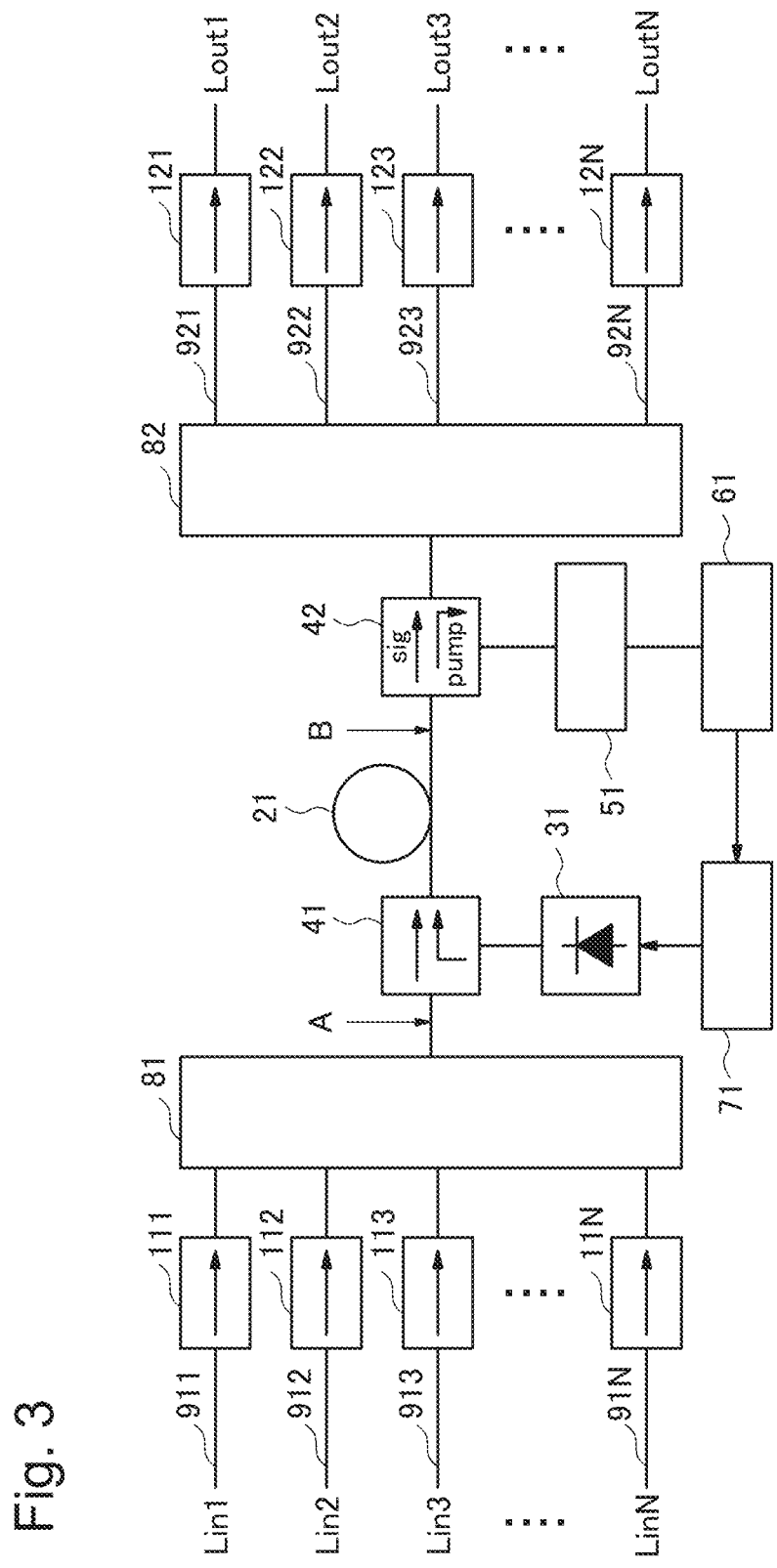
FIG. 3 is a configuration diagram for describing an optical fiber amplifier according to a second example embodiment.

Next, an optical fiber amplifier, a control method of the optical fiber amplifier, and a transmission system according to a second example embodiment are described. FIG. 3 is a configuration diagram of an optical fiber amplifier according to the second example embodiment. A component similar to a component according to the second example embodiment is assigned with the same reference sign, and thereby detailed description thereof is omitted.

The optical fiber amplifier in FIG. 3 includes a multicore optical fiber 21 including a plurality of cores in one optical fiber, an optical multiplexer 41 relevant to the multicore optical fiber 21, and an optical splitting unit 42 relevant to the multicore optical fiber 21. The optical fiber amplifier in FIG. 3 further includes a pumping light source 31, a light-source drive circuit 71, a light-source-drive-circuit control device 61, and a pumping light intensity monitor 51.

The optical fiber amplifier in FIG. 3 further includes a fiber bundle fan-out 81 that bundles N fibers including one core in one fiber into one fiber in which N cores are included in one fiber, and a fiber bundle fan-in 82 that branches one fiber in which N cores are included in one fiber into N fibers including one core in one fiber. The optical fiber amplifier in FIG. 3 further includes N single-core fibers 91 (911 to 91N), and N single-core fibers 92 (921 to 92N).

It is assumed that bands of optical signals Lin1 to LinN propagating in N single-core fibers 91 (911 to 91N) are filled in such a way as to be uniform, and even when the bands are non-uniform, the bands are assumed to be non-uniform by one wavelength between cores.

The optical fiber amplifier in FIG. 3 further includes N optical isolators 11 (111 to 11N) in relation to N single-core fibers 91 (911 to 91N). The optical fiber amplifier further includes N optical isolators 12 (121 to 12N) in relation to N single-core fibers 92 (921 to 92N). N optical isolators 11 (111 to 11N) and N optical isolators 12 (121 to 12N) restrict a propagation direction of an optical signal to a certain direction.

The multicore optical fiber 21 is an optical fiber that includes a plurality of cores and a clad in a periphery of the plurality of cores in one optical fiber, and is doped with rare earth ions. Herein, a case where the multicore optical fiber 21 is doped with erbium ions is described as an example. Description is made, assuming that a range from a position A to a position B illustrated in FIG. 3 is doped with erbium ions.

The pumping light source 31 outputs pumping light, and the optical multiplexer 41 multiplexes the pumping light with the multicore optical fiber 21. The optical splitting unit 42 splits a part of residual pumping light, and the pumping light intensity monitor 51 monitors the split pumping light. The light-source-drive-circuit control device 61 controls the light-source drive circuit 71, and the light-source drive circuit 71 drives the pumping light source 31.

Optical signals Lin1 to LinN input through the single-core fiber 91 (911 to 91N) pass through the optical isolator 11 (111 to 11N) and enter the fiber bundle fan-out 81. The fiber bundle fan-out 81 bundles N fibers including one core in one fiber, from N optical isolators 11 (111 to 11N), into one fiber including N cores in one fiber. The fiber bundle fan-out 81 outputs optical signals Lin1 to LinN to the multicore optical fiber 21 including a plurality of cores in one optical fiber and to N cores in one optical fiber.

When passing through the multicore optical fiber 21 doped with erbium ions, optical signals Lin1 to LinN are optically amplified by pumping light supplied from the optical multiplexer 41.

According to the present example embodiment, the optical multiplexer 41 causes pumping light to be collectively combined with optical signals Lin1 to LinN passing through N cores. Specifically, the optical multiplexer 41 inputs pumping light to a clad in a periphery of a plurality of cores of the multicore optical fiber 21 and thereby causes pumping light to be collectively combined with optical signals Lin1 to LinN passing through N cores.

The optical splitting unit 42 demultiplexes, among pumping-light output by the pumping light source 31, residual pumping light having not been absorbed by the multicore optical fiber 21 and having not been used for signal light amplification, from the multicore optical fiber 21. The optical splitting unit 42 may include, as a demultiplexer, for example, a dichroic mirror that transmits signal light and reflects pumping light. However, a demultiplexer for demultiplexing a pumping-light output from the multicore optical fiber 21 may be a means other than a dichroic mirror.

The pumping light intensity monitor 51 is capable of monitoring a wavelength of pumping light, and includes, for example, a photo-diode having high photoelectric conversion efficiency at a wavelength band periphery of pumping light. However, a sensor for monitoring an intensity of residual pumping light may be a sensor other than a photo-diode. The pumping light intensity monitor 51 notifies the light-source-drive-circuit control device 61 of an output intensity of pumping light, as a monitoring result.

The pumping light source 31 is achieved, for example, by a semiconductor laser diode. The light-source-drive-circuit control device 61 and the light-source drive circuit 71 are each achieved by a dedicated processor.

(Description of an Operation)

Next, an example of an operation of the optical fiber amplifier according to the second example embodiment is described.

Optical signals Lin1 to LinN are input, through the fiber bundle fan-out 81, to the multicore optical fiber 21 including a plurality of cores in one optical fiber. A wavelength of each of the optical signals Lin1 to LinN is, for example, in a 1.55 µm band. The optical isolator 11 (111 to 11N) restricts a propagation direction of an optical signal to a certain direction.

The optical multiplexer 41 causes pumping light to be collectively combined with optical signals Lin1 to LinN passing through N cores. Specifically, the optical multiplexer 41 inputs pumping light to a clad in a periphery of a plurality of cores of the multicore optical fiber 21 and thereby causes the pumping light to be collectively combined with optical signals Lin1 to LinN passing through N cores.

Optical signals Lin1 to LinN combined with pumping light pass through a range doped with rare earth ions (erbium ions in the present example) in the multicore optical fiber 21, and thereby a signal intensity is amplified. Optical signals Lin1 to LinN are combined with pumping light having bands of the optical signals Lin1 to LinN and having a pumping-light output intensity calculated by the light-source-drive-circuit control device 61. As a result, a signal intensity of each of the optical signals Lin1 to LinN is amplified to a certain signal intensity.

The optical splitting unit 42 splits residual pumping light propagating in the multicore optical fiber 21. The pumping light intensity monitor 51 notifies the light-source-drive-circuit control device 61 of an intensity of pumping light. The light-source-drive-circuit control device 61 stores a relation between bands of beams of signal light Lin1 to LinN and an intensity of residual pumping light. Alternatively, the light-source-drive-circuit control device 61 is notified of current bands of beams of signal light Lin1 to LinN, from a high-order network layer. The light-source-drive-circuit control device 61 confirms, based on a signal intensity notified from the pumping light intensity monitor 51, that an intensity of residual pumping light has a predetermined certain value with respect to a band of signal light. When an intensity of residual pumping light does not have a predetermined certain value, the light-source-drive-circuit control device 61 controls the light-source drive circuit 71 in such a way as to achieve a certain value and adjusts an intensity of pumping-light output from the pumping light source 31.

It is assumed that, for example, a band is N-wavelengths-multiplexed and it is necessary for an intensity of residual pumping light to be fixed at P. When an actual intensity of residual pumping light notified from the pumping light intensity monitor 51 is smaller than P, it is indicated that signal light of a wavelength multiplexing number N is not sufficiently excited, and therefore the light-source-drive-circuit control device 61 controls the light-source drive circuit 71 in such a way as to increase a pumping-light output from the pumping light source 31. When an actual intensity of residual pumping light notified from the pumping light intensity monitor 51 is larger than P, it is indicated that signal light of a wavelength multiplexing number N is excessively excited, and therefore the light-source-drive-circuit control device 61 controls the light-source drive circuit 71 in such a way as to decrease a pumping-light output from the pumping light source 31.

Beams of signal light Lout1 to LoutN after amplification having passing through the optical splitting unit 42 are divided into N single-core fibers 92 (921 to 92N) by the fiber bundle fan-in 82 and each of the divided beams of signal light is propagated. N optical isolators 12 (121 to 12N) each restrict a propagation direction of an optical signal to a certain direction.

According to the present example embodiment, without directly using some beams of signal light Lout1 to LoutN, a band of each of the beams of signal light Lout1 to LoutN can be monitored from pumping light. Therefore, a problem in that an output optical intensity of beams of signal light Lout1 to LoutN decreases and a problem in that power consumption of an optical fiber amplifier increases in order to complement such a decreased output intensity of beams of signal light Lout1 to LoutN can be avoided.

When it is assumed that a signal light demultiplexer having a demultiplexing rate of 10:1 is used, a loss of beams of signal light Lout1 to LoutN is approximately 9.09%, and a signal light gain and pumping-light output, and power consumption in the pumping light source 31 are proportionally related, power use efficiency increases by approximately 10.01%. In this manner, an optical fiber amplifier having high power use efficiency can be achieved.

According to the present example embodiment, pumping light propagating in the clad of the multicore optical fiber 21 is collected based on a clad-collective pumping method, and therefore pumping light having a sufficient intensity as a monitor value can be collected.

In a method of collecting pumping light propagating in a core, it is assumable that an intensity of collectable pumping light is weak and it is difficult to provide a feedback to a control means. In a method of collecting pumping light propagating in a core, when pumping light propagating in a core is collected, a part of signal light is simultaneously collected, depending on a wavelength of the pumping light. When such collect of signal light occurs, quality degradation occurs in signal light output by an optical fiber amplifier.

In contrast, according to the present example embodiment, pumping light propagating in the clad of the multicore optical fiber 21 is collected based on the clad-collective pumping method, and therefore quality degradation of signal light output by the optical fiber amplifier can be prevented from occurring.

The optical splitting unit 42 splits a part of residual pumping light. The pumping light intensity monitor 51 monitors pumping light split by the optical splitting unit 42. The light-source-drive-circuit control device 61 controls the light-source drive circuit 71 according to a monitoring result of the pumping light intensity monitor 51. The light-source drive circuit 71 drives the pumping light source 31.

The pumping light intensity monitor 51 detects residual pumping light propagating in a clad inside the multicore optical fiber 21. The residual pumping light detected by the pumping light intensity monitor 51 is residual pumping light propagating in the clad inside the multicore optical fiber 21, and when bands of optical signals Lin1 to LinN propagating in N single-core fibers 91 (911 to 91N) are filled in such a way as to be uniform, a required band in each core can be calculated from an intensity of the residual pumping light.

(Description of an Advantageous Effect)

According to the present example embodiment, without directly using some beams of signal light Lout1 to LoutN, a band of each of the beams of signal light Lout1 to LoutN can be monitored from residual pumping light propagating in the clad of the multicore optical fiber 21. Thereby, without decreasing output intensities of beams of signal light Lout1 to LoutN, a band can be monitored. Even when the number of cores of the multicore optical fiber 21 increases, a band can be monitored without increasing the number of parts of a monitor and the like. Thereby, when the number of cores of the multicore optical fiber 21 is N, a cost of a monitor unit becomes 1/N due to reduction of the number of parts. In this manner, an advantageous effect of cost reduction of the optical fiber amplifier is produced.

Third Example Embodiment

Figure 4:
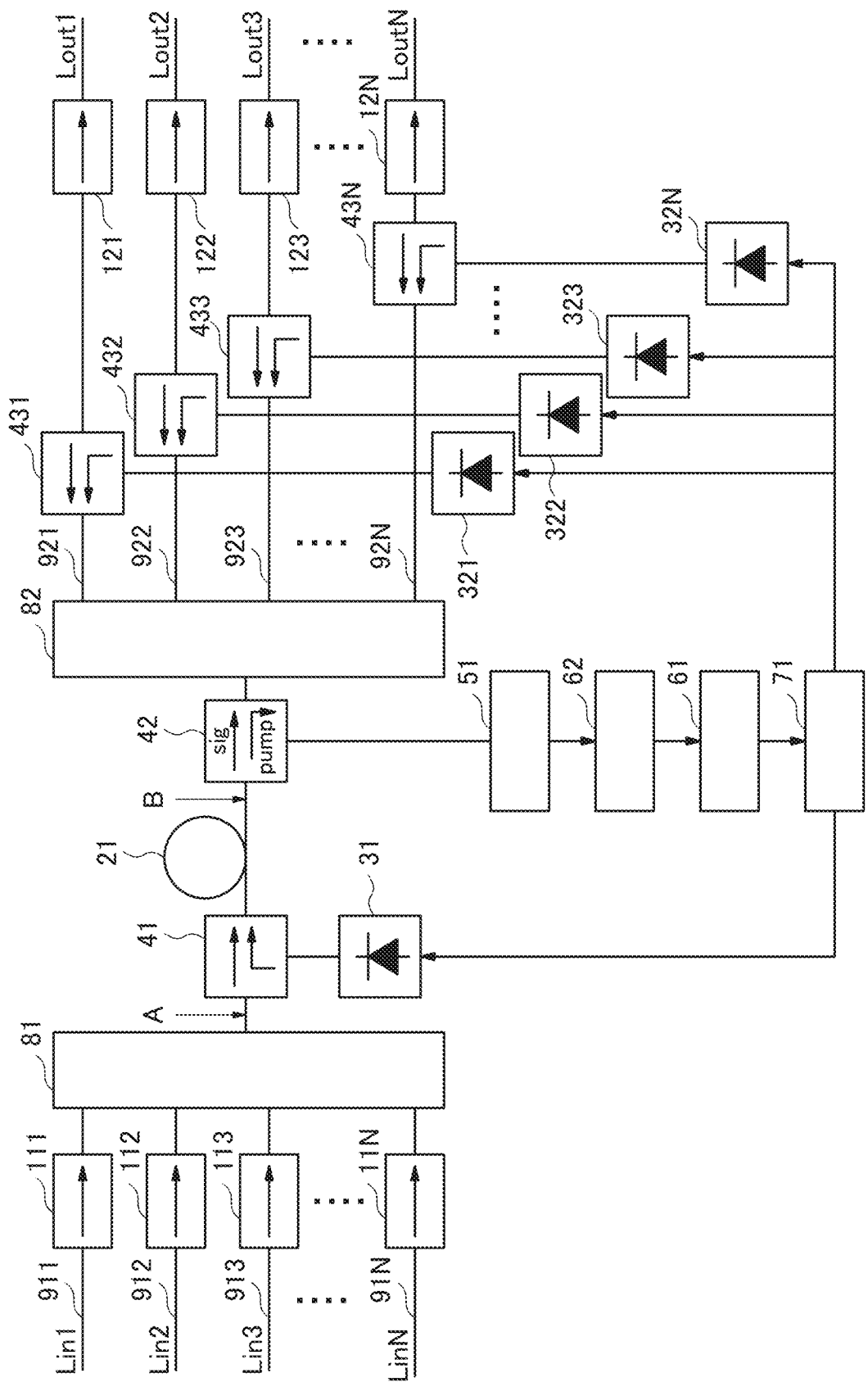
FIG. 4 is a configuration diagram for describing an optical fiber amplifier according to a third example embodiment.

Next, an optical fiber amplifier, a control method of the optical fiber amplifier, and a transmission system according to a third example embodiment of the present invention are described. FIG. 4 is a configuration diagram of the optical fiber amplifier according to the third example embodiment. A component similar to a component according to the first example embodiment and the second example embodiment is assigned with the same reference sign, and thereby detailed description thereof is omitted.

The optical fiber amplifier in FIG. 4 includes, similarly to the first example embodiment and the second example embodiment, a multicore optical fiber 21 including a plurality of cores in one optical fiber, an optical multiplexer 41 relevant to the multicore optical fiber 21, and an optical splitting unit 42 relevant to the multicore optical fiber 21. The optical fiber amplifier in FIG. 4 further includes a pumping light source 31, a light-source drive circuit 71, a light-source-drive-circuit control device 61, and a pumping-light intensity monitor 51.

The optical fiber amplifier in FIG. 4 further includes, similarly to the second example embodiment, a fiber bundle fan-out 81 that bundles N fibers including one core in one fiber into one fiber including N cores in one fiber, and N optical isolators 11 (111 to 11N).

The optical fiber amplifier in FIG. 4 further includes, similarly to the second example embodiment, a fiber bundle fan-in 82 that branches one fiber including N cores in one fiber into N fibers including one core in one fiber, and N optical isolators 12 (121 to 12N).

The optical fiber amplifier in FIG. 4 further includes core-individual-pumping light sources 32 (321 to 32N) and optical multiplexers 43 (431 to 43N). Both of the core-individual-pumping light sources 32 (321 to 32N) and the optical multiplexers 43 (431 to 43N) are provided to each of N single-core fibers 92 (921 to 92N) including one core in one optical fiber. Output from the core-individual-pumping light sources 32 (321 to 32N) is combined with a core of each of the single-core fibers 92 (921 to 92N) by the optical multiplexers 43 (431 to 43N).

The optical fiber amplifier in FIG. 4 further includes an optimum-ratio storage device 62. The optimum-ratio storage device 62 stores a relation between an intensity of residual light from the pumping light intensity monitor 51 and an optimum ratio (of cladding-pumping-light output/core-pumping-light output). According to the present example embodiment, output of the pumping light intensity monitor 51 is connected to input of the optimum-ratio storage device 62, and output of the optimum-ratio storage device 62 is connected to input of the light-source-drive-circuit control device 61.

Also, according to the present example embodiment, similarly to the first example embodiment and the second example embodiment, the optical multiplexer 41 causes pumping light to be collectively combined with optical signals Lin1 to LinN passing through N cores. Specifically, the optical multiplexer 41 inputs pumping light to a clad in a periphery of a plurality of cores of the multicore optical fiber 21 and thereby causes the pumping light to be collectively combined with optical signals Lin1 to LinN passing through N cores. According to the present example embodiment, the optical multiplexer 41 causes pumping light to be combined with optical signals Lin1 to LinN in a form of forward pumping in which the pumping light is directed to the same direction as a propagation direction of signal light.

Next, an operation specifically based on the core-individual-pumping light sources 32 (321 to 32N) and the optimum-ratio storage device 62 is described.

An output wavelength of the core-individual-pumping light sources 32 (321 to 32N) is in a 0.98 μm band or a 1.48 μm band, and is effective for a case when the output wavelength of the core-individual-umping light sources32 (321 to 32N) is the same as and different from a wavelength band of the pumping light source 31. In other words, while a wavelength band of the pumping light source 31 is in a 0.98 μm band, an output wavelength of the core-individual-pumping light sources 32 (321 to 32N) is in a 0.98 μm band or a 1.48 μm band. In addition, while a wavelength band of the pumping light source 31 is in a 1.48 μm band, an output wavelength of the core-individual-pumping light sources 32 (321 to 32N) is in a 0.98 μm band or a 1.48 μm band. Herein, wavelengths of the core-individual-pumping light sources 321 to 32N are the same.

While the pumping light source 31 is combined with optical signals Lin1 to LinN in a form of forward pumping in the illustration in FIG. 4, in this case, the core-individual-pumping light sources 32 (321 to 32N) are combined with optical signals Lout1 to LoutN, respectively, in a form of backward pumping. However, the pumping light source 31 may be combined with optical signals Lin1 to LinN in a form of backward pumping and the core-individual-pumping light sources 321 to 32N may be combined with optical signals Lout1 to LoutN in a form of forward pumping.

The optimum-ratio storage device 62 stores a relation between an intensity of residual light from the pumping light intensity monitor 51 and an optimum ratio (of cladding-pumping-light output/core-pumping-light output). Specifically, the optimum-ratio storage device 62 stores a ratio between cladding-pumping-light output and core-pumping-light output in such a way as to minimize a power consumption total of all pumping light sources with respect to an intensity value of residual light. The optimum-ratio storage device 62 notifies the light-source-drive-circuit control device 61 of an output value of cladding-pumping light and an output value of core pumping light, based on output of the pumping light intensity monitor 51.

(Description of an Operation)

Next, an example of an operation of the optical fiber amplifier according to the third example embodiment is described. Also, according to the third example embodiment, similarly to the first example embodiment and the second example embodiment, the optical multiplexer 41 causes pumping light from the pumping light source 31 to be combined with optical signals Lin1 to LinN. The optical multiplexers 43 (431 to 43N) causes pumping light from the core-individual-pumping light sources 32 (321 to 32N) to be combined with optical signals Lout to LoutN.

Optical signals Lin1 to LinN combined with pumping light pass through the multicore optical fiber 21 and thereby a signal intensity is amplified. At that time, the optical splitting unit 42 splits residual pumping light propagating together with the amplified optical signals Lin1 to LinN in the multicore optical fiber 21. The pumping light intensity monitor 51 notifies the optimum-ratio storage device 62 of an intensity of pumping light. The optimum-ratio storage device 62 calculates, based on a signal intensity reported from the pumping light intensity monitor 51, an optimum ratio of cladding-pumping-light output/core-pumping-light output, and notifies the light-source-drive-circuit control device 61 of an output value of cladding-pumping light and an output value of core pumping light. The light-source-drive-circuit control device 61 drives, based on the notified values, the light-source drive circuit 71. It is assumed that output intensities of beams of pumping light from the core-individual-pumping light sources 32 (321 to 32N) have the same output value.

(Description of an Advantageous Effect)

According to the present example embodiment, similarly to the first example embodiment and the second example embodiment, without directly using some beams of signal light Lout1 to LoutN, a band of each of the beams of signal light Lout1 to LoutN can be monitored from residual pumping light propagating in the clad of the multicore optical fiber 21. Thereby, without a decrease in output intensities of beams of signal light Lout1 to LoutN, a band can be monitored. Even when the number of cores of the multicore optical fiber 21 increases, a band can be monitored without increasing the number of parts of a monitor and the like.

According to the present example embodiment, when bands of optical signals Lin1 to LinN propagating in N single-core fibers 91 (911 to 91N) are uniform, a ratio of cladding-pumping-light output/core-pumping-light output at which power consumption is minimized for a required band can be selected. Thereby, a low-power-consumption operation of an amplifier module is made possible.

Fourth Example Embodiment

Figure 5:
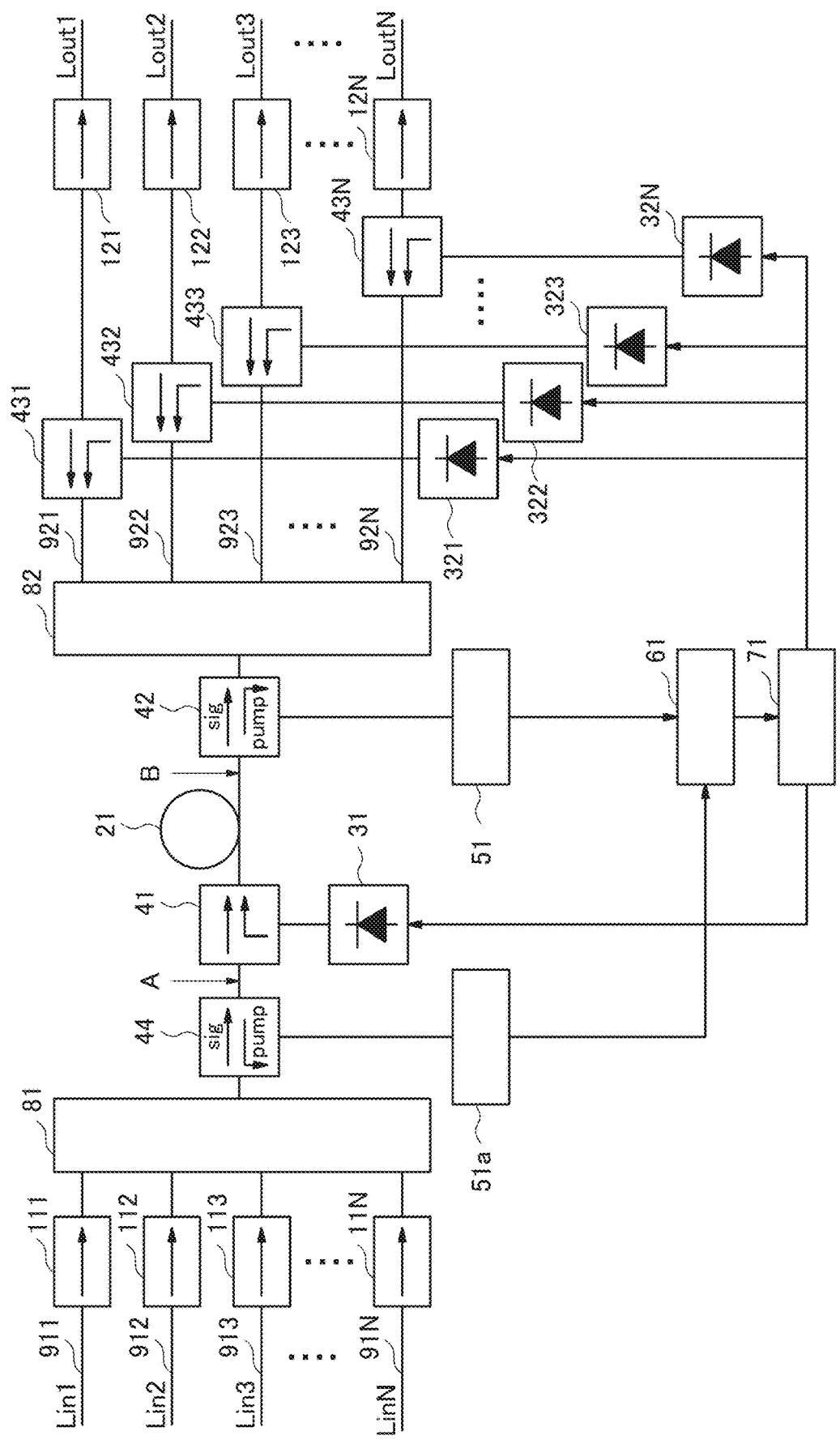
FIG. 5 is a configuration diagram for describing an optical fiber amplifier according to a fourth example embodiment.

Next, an optical fiber amplifier, a control method of the optical fiber amplifier, and a transmission system according to a fourth example embodiment of the present invention are described. FIG. 5 is a configuration diagram of the optical fiber amplifier according to the fourth example embodiment. A component similar to a component according to the first example embodiment, the second example embodiment, and the third example embodiment is assigned with the same reference sign, and thereby detailed description thereof is omitted.

The optical fiber amplifier in FIG. 5 includes, similarly to the first example embodiment to the third example embodiment, a multicore optical fiber 21 including a plurality of cores in one optical fiber, an optical multiplexer 41 relevant to the multicore optical fiber 21, and an optical splitting unit 42 relevant to the multicore optical fiber 21. The optical fiber amplifier in FIG. 5 further includes a pumping light source 31, a light-source drive circuit 71, a light-source-drive-circuit control device 61, and a pumping-light intensity monitor 51.

The optical fiber amplifier in FIG. 5 further includes, similarly to the second example embodiment and the third example embodiment, a fiber bundle fan-out 81 that bundles N fibers including one core in one fiber into one fiber including N cores are included in one fiber, and N optical isolators 11 (111 to 11N).

The optical fiber amplifier in FIG. 5 further includes, similarly to the second example embodiment and the third example embodiment, a fiber bundle fan-in 82 that branches one fiber including N cores in one fiber into N fibers including one core in one fiber, and N optical isolators 12 (121 to 12N).

The optical fiber amplifier in FIG. 5 further includes, similarly to the third example embodiment, core-individual-pumping light sources 32 (321 to 32N), and optical multiplexers 43 (431 to 43N). Both of the core-individual-pumping light sources 32 (321 to 32N) and the optical multiplexers 43 (431 to 43N) are provided to each of N single-core fibers 92 (921 to 92N) including one core in one optical fiber. Output from the core-individual-pumping light sources 32 (321 to 32N) is combined with a core of each of the single-core fibers 92 (921 to 92N) by the optical multiplexers 43 (431 to 43N).

The optical fiber amplifier in FIG. 5 further includes a core-propagation-pumping light splitting unit 44 and a core-propagation-pumping-light intensity monitor 51a. The core-propagation-pumping light splitting unit 44 is connected to the core-propagation-pumping-light intensity monitor 51a, and the core-propagation-pumping-light intensity monitor 51a is connected to the light-source-drive-circuit control device 61.

Also, according to the present example embodiment, similarly to the first example embodiment to the third example embodiment, the optical multiplexer 41 causes pumping light to be collectively combined with optical signals Lin1 to LinN passing through N cores of the multicore optical fiber 21. Specifically, the optical multiplexer 41 inputs pumping light to a clad in a periphery of a plurality of cores of the multicore optical fiber 21 and thereby causes the pumping light to be collectively combined with optical signals Lin1 to LinN passing through N cores.

An output wavelength of the core-individual-pumping light sources 32 (321 to 32N) is in a 0.98 µm band or a 1.48 µm band and is effective for a case when the output wavelength of the core-individual-pumping light sources 32 (321 to 32N) is the same as and different from a wavelength band of the pumping light source 31. In other words, while a wavelength band of the pumping light source 31 is a 0.98 µm band, an output wavelength of the core-individual-pumping light sources 32 (321 to 32N) is in a 0.98 µm band or a 1.48 µm band. In addition, while a wavelength band of the pumping light source 31 is a 1.48 µm band, an output wavelength of the core-individual-pumping light sources 32 (321 to 32N) is in a 0.98 µm band or a 1.48 µm band. Herein, wavelengths of core-individual-pumping light sources 32 (321 to 32N) are the same.

While the pumping light source 31 is combined with optical signals Lin1 to LinN in a form of forward pumping in the illustration of FIG. 5, in this case, core-individual-pumping light sources 32 (321 to 32N) are combined with optical signals Lout1 to LoutN, respectively, in a form of backward pumping. However, the pumping light source 31 may be combined with optical signals Lin1 to LinN in a form of backward pumping and core-individual-pumping light sources 32 (321 to 32N) may be combined with optical signals Lout1 to LoutN in a form of forward pumping.

The core-propagation-pumping light splitting unit 44 splits, among pumping-light output by the core-individual-pumping light sources 32 (321 to 32N), residual pumping light having not been absorbed by cores of the multicore optical fiber 21 and having not been used for signal light amplification, from the multicore optical fiber 21. As a demultiplexer of the core-propagation-pumping light splitting unit 44, for example, a dichroic mirror that transmits signal light and reflects pumping light may be provided. However, a demultiplexer for demultiplexing pumping-light output from the multicore optical fiber 21 may be a means other than a dichroic mirror.

The core-propagation-pumping-light intensity monitor 51a includes a photo-diode capable of monitoring a wavelength of pumping light and having high photoelectric conversion efficiency at a wavelength band periphery of pumping light. However, a sensor for monitoring an intensity of residual pumping light may be a sensor other than a photo-diode. The core-propagation-pumping-light intensity monitor 51a notifies the light-source-drive-circuit control device 61 of an output intensity of pumping light.

(Description of an Operation)

Next, an example of an operation of the optical fiber amplifier according to the fourth example embodiment is described. Also, according to the present example embodiment, similarly to the first example embodiment and the second example embodiment, the optical multiplexer 41 causes pumping light from the pumping light source 31 to be combined with optical signal Lin1 to LinN. Also, according to the present example embodiment, similarly to the second example embodiment, the optical multiplexers 43 (431 to 43N) causes pumping light from the core-individual-pumping light sources 32 (321 to 32N) to be combined with optical signals Lout1 to LoutN.

Optical signals Lin1 to LinN combined with pumping light pass through the multicore optical fiber 21 and thereby a signal intensity is amplified. At that time, the optical splitting unit 42 splits residual pumping light propagating together with the amplified optical signals Lin1 to LinN in the multicore optical fiber 21. The core-propagation-pumping light splitting unit 44 splits residual pumping light propagating together with optical signals Lin1 to LinN before amplification in the multicore optical fiber 21. The pumping light intensity monitor 51 and the core-propagation-pumping-light intensity monitor 51a notify the light-source-drive-circuit control device 61 of an intensity of pumping light.

The light-source-drive-circuit control device 61 drives the light-source drive circuit 71, based on a signal intensity notified from the pumping light intensity monitor 51 and the core-propagation-pumping-light intensity monitor 51a. The light-source-drive-circuit control device 61 stores a relation between a band of each of beams of signal light Lin1 to LinN propagating in cores and an intensity of residual pumping light. Alternatively, the light-source-drive-circuit control device 61 is notified of current bands of beams of signal light Lin1 to LinN, from a high-order network layer. The light-source-drive-circuit control device 61 confirms, based on a signal intensity notified from the pumping light intensity monitor 51 and the core-propagation-pumping-light intensity monitor 51a, that an intensity of residual pumping light has a predetermined certain value with respect to a band of signal light. When an intensity of residual pumping light does not have a predetermined certain value, the light-source-drive-circuit control device 61 controls the light-source drive circuit 71 in such a way as to achieve a certain value. Based on control of the light-source drive circuit 71, an intensity of pumping-light output from the pumping light source 31 and core-individual-pumping light sources 321 to 32N is adjusted. Output intensities of beams of pumping light from core-individual-pumping light sources 32 (321 to 32N) may have the same output value or different output values.

(Description of an Advantageous Effect)

According to the present example embodiment, similarly to the first example embodiment, the second example embodiment, and the third example embodiment, without directly using some beams of signal light Lout1 to LoutN, a band of each of the beams of signal light Lout1 to LoutN can be monitored from residual pumping light propagating in the clad of the multicore optical fiber 21. Thereby, without a decrease in output intensities of beams of signal light Lout1 to LoutN, a band can be monitored. Even when the number of cores of the multicore optical fiber 21 increases, a band can be monitored without increasing the number of parts of a monitor and the like.

According to the present example embodiment, even when bands of beams of signal light Lout1 to LoutN propagating in N single-core fibers 91 (911 to 91N) are non-uniform, monitoring an intensity of pumping light with respect to each core copes with this situation. Thereby, output of each of the core-individual-pumping light sources 32 (321 to 32N) can be set in such a way as to minimize power consumption for a required band of each core. Thereby, even when bands of beams of signal light Lout1 to LoutN propagating in N single-core fiber 91 (911 to 91N) are non-uniform, a low-power-consumption operation of an amplifier module is made possible.

Fifth Example Embodiment

Figure 6:
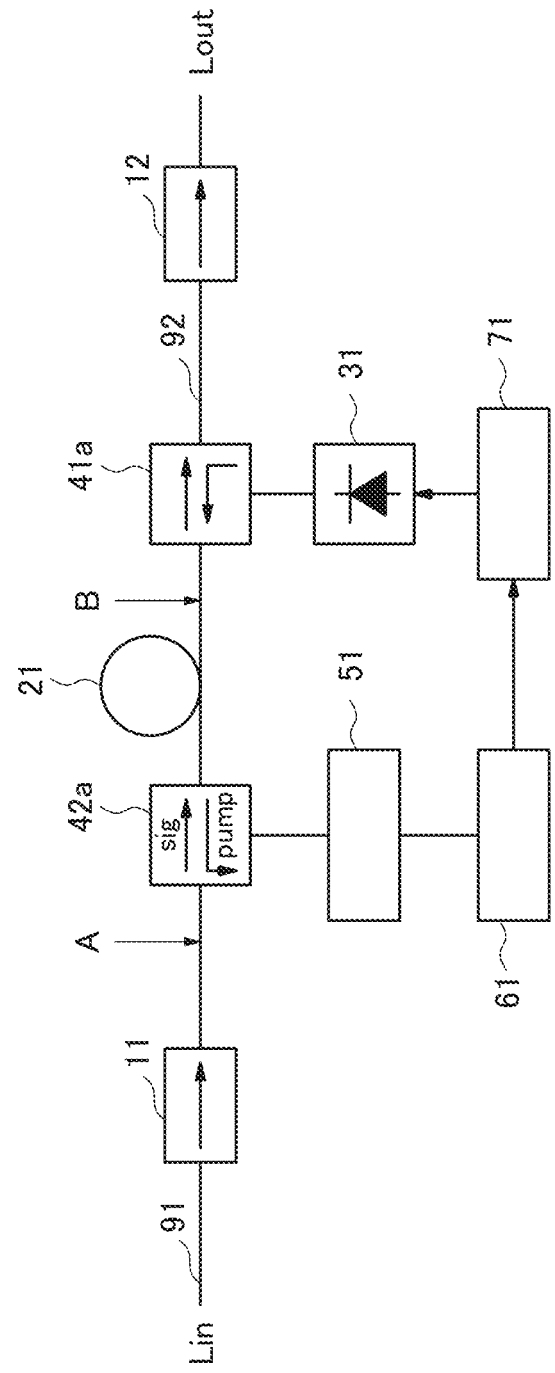
FIG. 6 is a configuration diagram for describing an optical fiber amplifier according to a fifth example embodiment.

While desirable example embodiments have been described, according to the above-described example embodiments, it is conceivable that the following modified examples are made. For example, according to the second example embodiment and the like, a case where the optical multiplexer 41 causes pumping light to be combined with optical signals Lin1 to LinN in a form of forward pumping in which the pumping light is directed to the same direction as a propagation direction of signal light has been described. An optical multiplexer may cause pumping light to be combined with optical signals Lin1 to LinN in a form of backward pumping in which the pumping light us directed to an opposite direction to a propagation direction of signal light. FIG. 6 is a block diagram illustrating main portions of a modified example of the optical fiber amplifier according to the first example embodiment. In an optical fiber amplifier in FIG. 6, an optical splitting unit 42a is provided on an upstream side from an optical multiplexer 41a. The optical multiplexer 41a propagates pumping-light output from a pumping light source 31 to the upstream side and causes the pumping light to be combined with optical signals Lin1 to LinN.

Also, according to the present example embodiment, similarly to the first example embodiment, the optical multiplexer 41a causes pumping light to be collectively combined with optical signals Lin1 to LinN passing through N cores. Specifically, the optical multiplexer 41a inputs pumping light to a clad in a periphery of a plurality of cores of a multicore optical fiber 21, and thereby causes the pumping light to be collectively combined with optical signals Lin1 to LinN passing through N cores.

The optical multiplexer 41a propagates pumping-light output from the pumping light source 31 to an upstream side. An optical splitting unit 42a splits, from the multicore optical fiber 21, the pumping light propagated to the upstream side by the optical multiplexer 41a. The optical splitting unit 42a may include, as a demultiplexer, for example, a dichroic mirror that transmits signal light and reflects pumping light. However, a demultiplexer for demultiplexing a pumping-light output from the multicore optical fiber 21 may be a means other than a dichroic mirror.

A pumping light intensity monitor 51 is capable of monitoring a wavelength of pumping light, and the pumping light intensity monitor 51 notifies, a light-source-drive-circuit control device 61 of an output intensity of pumping light, as a monitoring result.

Other points are similar to corresponding points in the first example embodiment.

Sixth Example Embodiment

Figure 7:
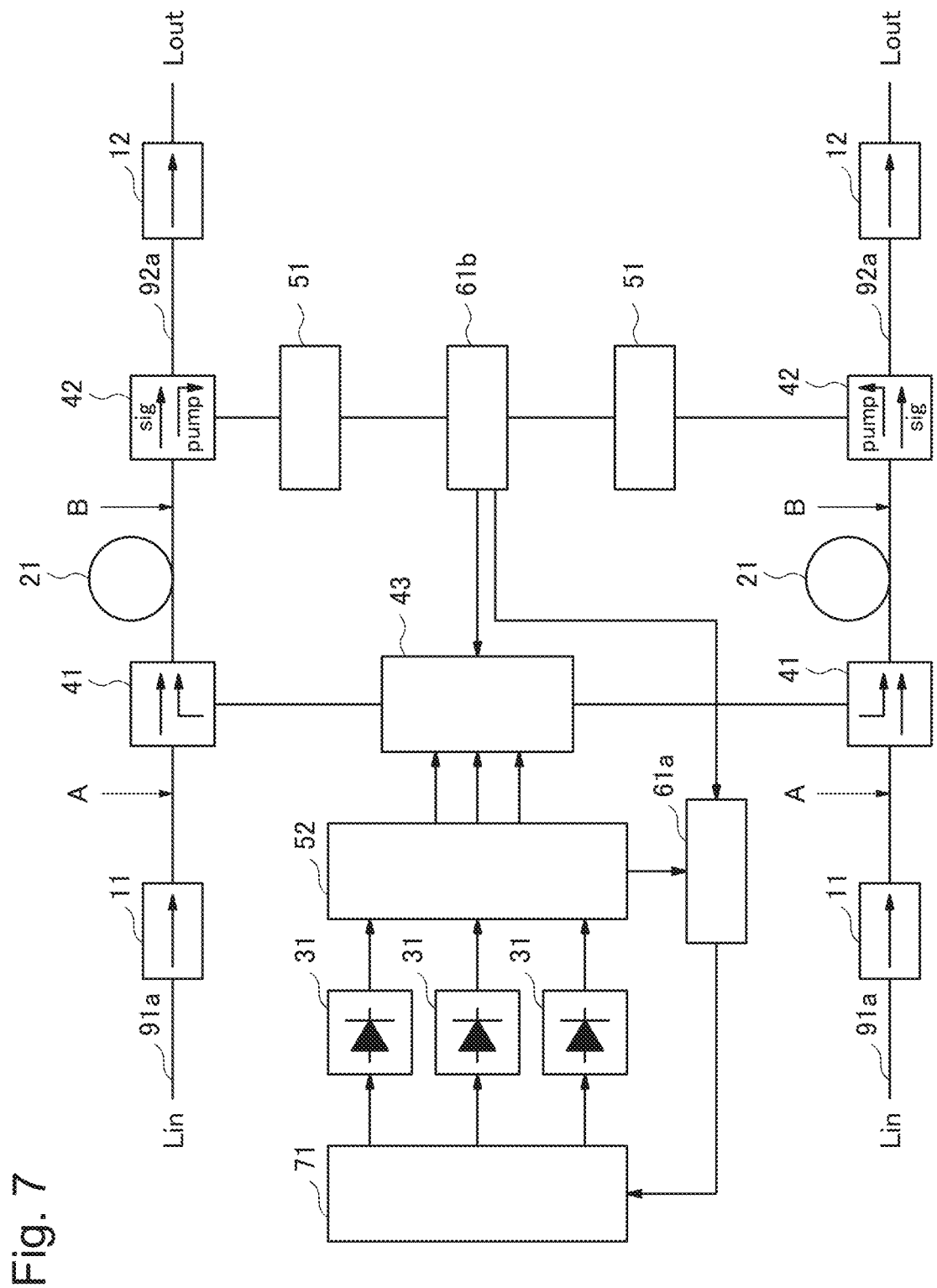
FIG. 7 is a configuration diagram for describing an optical fiber amplifier according to a sixth example embodiment.

Another modified example according to the example embodiment is described. FIG. 7 is a block diagram illustrating a configuration example of an optical fiber amplifier according to a sixth example embodiment, and some or all of a plurality of pumping light sources 31 are flexibly used and thereby improvement in redundancy with respect to a failure of a pumping light source and the like and cost reduction and power reduction of an optical fiber amplifier are intended to be achieved. A component similar to a component described according to the first example embodiment and the like is assigned with the same reference sign and description thereof is omitted.

The optical fiber amplifier according to the sixth example embodiment includes, in addition to the components included in the optical fiber amplifier according to the first example embodiment, an optical multiplexer 43 having N inputs and M outputs. It is assumed that N is an integer equal to or more than 1 and M is an integer equal to or more than 2, and values of N and M are not correlated. According to the present example embodiment, a case where N=3 and M=2 is described. According to the sixth example embodiment, a pumping light output monitor 52 that monitors output from a pumping light source 31 is included. According to the sixth example embodiment, an optical-multiplexer/demultiplexer-drive control device 61b is included. A pumping light intensity monitor 51 is connected to the optical-multiplexer/demultiplexer-drive control device 61b, and the optical-multiplexer/demultiplexer-drive control device 61b is connected to the optical multiplexer 43 and a light-source-drive-circuit control device 61a. M (=2) outputs of the optical multiplexer 43 are connected to M (=2) optical multiplexers 41, respectively. N(=2) inputs of the optical multiplexer 43 are connected to the pumping light output monitor 52 that monitors a state of each of N(=3) beams of pumping light.

A plurality of pumping light sources 31 according to the sixth example embodiment are pumping light sources each having the same characteristics.

Next, the optical multiplexer 43 and the optical-multiplexer/demultiplexer-drive control device 61b are described.

Beams of pumping light from the pumping light source 31 input to N input ports of the optical multiplexer 43 are output to M output ports while a wavelength of a 0.98 μm band or a wavelength of a 1.48 μm band are maintained. At that time, a sum of optical intensities of the beams of pumping light input to the N input ports is matched with a sum of optical intensities of beams of pumping-light output from the M output ports. In other words, intensities of all beams of pumping light input to the N input ports are not subjected to a loss in the optical multiplexer 43 and are output to the M output ports. The optical multiplexer 43 can output, from the M output ports, any intensities of beams of pumping light input to the N input ports, as any intensities of beams of pumping light.

For example, in a case where N=3 and M=2, when a first port input intensity on an input side is P1, a second port input intensity on the input side is P2, a third port input intensity on the input side is P3, a total optical intensity is P1+P2+P3, and a first port output intensity on an output side is P, a second port output intensity on the output side is (P1+P2+P3)−P.

The optical-multiplexer/demultiplexer-drive control device 61b controls an output-light distribution ratio when pumping light input to each input port of the optical multiplexer 43 at any intensity is output on an output side. The optical-multiplexer/demultiplexer-drive control device 61b notifies the light-source-drive-circuit control device 61a of a pumping-light output necessary for all optical fiber amplifiers, based on output from each of the pumping light intensity monitors 51.

The pumping light output monitor 52 monitors an output value of each of the connected pumping light sources 31, and notifies the light-source-drive-circuit control device 61a of the monitored output value. According to the present example embodiment, based on monitor information of the pumping light output monitor 52, the light-source-drive-circuit control device 61a determines whether the pumping light source 31 operates normally. When it is determined that the pumping light source 31 is not operating normally, the light-source drive circuit 71 is controlled in such a way as to drive only a light source that is normally. When, for example, it is determined that one pumping light source is not operating normally while N pumping light sources are driven with an output value P, driving of a pumping light source not operating normally is stopped and remaining (N−1) pumping light sources operating normally are driven with an output value (P×N)/(N−1).

Based on monitor information of the pumping light output monitor 52, the light-source-drive-circuit control device 61a determines whether the pumping light source 31 is operating normally. A point in that when it is determined that the pumping light source 31 is not operating normally, the light-source drive circuit 71 is controlled in such a way as to drive only a light source operating normally is applicable to example embodiments to be described later.

Next, an example of an operation of the optical fiber amplifier according to the sixth example embodiment is described. The optical multiplexer 41 causes pumping-light output from an output terminal of the optical multiplexer 43 to be combined with an optical signal Lin. The optical signal Lin combined with the pumping light passes through a range doped with rare earth ions (erbium ions in the present example) in the multicore optical fiber 21 and thereby a signal intensity of the optical signal Lin is amplified. The optical signal Lin is combined with pumping light having a band of the optical signal Lin and an output intensity of pumping light calculated by the optical-multiplexer/demultiplexer-drive control device 61b. As a result, a signal intensity of the optical signal Lin is amplified to a certain signal intensity, and is output through an optical fiber 92a, as an optical signal Lout.

At that time, the optical splitting unit 42 splits residual pumping light propagating together with the optical signal Lout in the optical fiber 92a. The pumping light intensity monitor 51 notifies the optical-multiplexer/demultiplexer-drive control device 61b of an intensity of pumping light.

The optical-multiplexer/demultiplexer-drive control device 61b notifies, based on the pumping light intensity monitor 51 and a value notified from the pumping light intensity monitor 51, the light-source-drive-circuit control device 61a of an intensity of pumping light necessary for amplifying a band of a signal passing through each multi-core optical fiber 21. The light-source-drive-circuit control device 61a having received the notification drives the light-source drive circuit 71 in such a way that a sum of intensities of beams of pumping-light output by all the pumping light sources 31 is matched with a value notified from a plurality of pumping light intensity monitors. An output intensity of pumping light from each pumping light source 31 is monitored by the pumping light output monitor 52, and the light-source-drive-circuit control device 61a is notified of the output intensity. Thereby, the light-source-drive-circuit control device 61a determines whether a light source is operating normally or is not operating normally, and controls, when the light source is not operating normally, the light-source drive circuit 71 in such a way as to drive only a light source operating normally. At the same time, the optical-multiplexer/demultiplexer-drive control device 61b controls, based on the connected pumping light intensity monitor 51 and a value reported from the pumping light intensity monitor 51, an output-light distribution ratio when output-light is output on an output side of the optical multiplexer 43.

According to the present example embodiment, instead of the light-source-drive-circuit control device 61a, the optical-multiplexer/demultiplexer-drive control device 61b stores a relation between a band of signal light Lin and an intensity of residual pumping light, or alternatively, the optical-multiplexer/demultiplexer-drive control device 61b is notified of a current band of signal light Lin, from a high-order network layer. The optical-multiplexer/demultiplexer-drive control device 61b confirms, based on an intensity of residual pumping light notified from the pumping light intensity monitor 51, that the intensity of residual pumping light has a predetermined certain value according to a band. When an intensity of residual pumping light does not have a predetermined certain value, the optical-multiplexer/demultiplexer-drive control device 61b controls the light-source drive circuit 71 through the light-source-drive-circuit control device 61a, in order to adjust output from the pumping light source 31.

For example, it is assumed that a band is N-wavelengths-multiplexed in an upper multicore optical fiber 21 in FIG. 7 and an intensity of residual pumping light needs to be fixed at P1. Further, it is assumed that a band is N-wavelengths-multiplexed in a lower multicore optical fiber 21 in FIG. 7 and an intensity of residual pumping light needs to be fixed at P2. At that time, when an actual intensity of residual pumping light notified from each pumping light intensity monitor 51 is smaller than P1+P2, it is indicated that signal light having a wavelength multiplexing number N and signal light having a wavelength multiplexing number M are not sufficiently excited, and therefore the light-source-drive-circuit control device 61a controls the light-source drive circuit 71 in such a way as to increase a pumping-light output from the pumping light source 31. When an actual intensity of residual pumping light notified from the pumping light intensity monitor 51 is larger than P1+P2, it is indicated that signal light having a wavelength multiplexing number N and signal light having a wavelength multiplexing number M are excessively excited, and therefore the light-source-drive-circuit control device 61a controls the light-source drive circuit 71 via the light-source-drive-circuit control device 61a in such a way as to decrease a pumping-light output from the pumping light source 31. At the same time, the optical-multiplexer/demultiplexer-drive control device 61b controls an output ratio of the optical multiplexer 43 in such a way as to satisfy (upper side)/(lower side)=N/M. However, when an output ratio is controlled in such a way as to satisfy (upper side)/(lower side)=N/M, signal amplification mounts of optical fiber amplifiers are equal, and when the signal amplification mounts are not equal, the output ratio is modified.

According to the present example embodiment, some or all of the plurality of pumping light sources 31 can be flexibly used, and therefore redundancy can be achieved with respect to a failure and the like of the pumping light source 31. When (number of pumping light sources)<(number of optical fiber amplifiers) is satisfied, the number of light sources can be reduced, and cost reduction, size reduction and the like are made possible. Under a high temperature environment, an effect of reducing pumping power consumption of a pumping light source can be expected.

Seventh Example Embodiment

Figure 8:
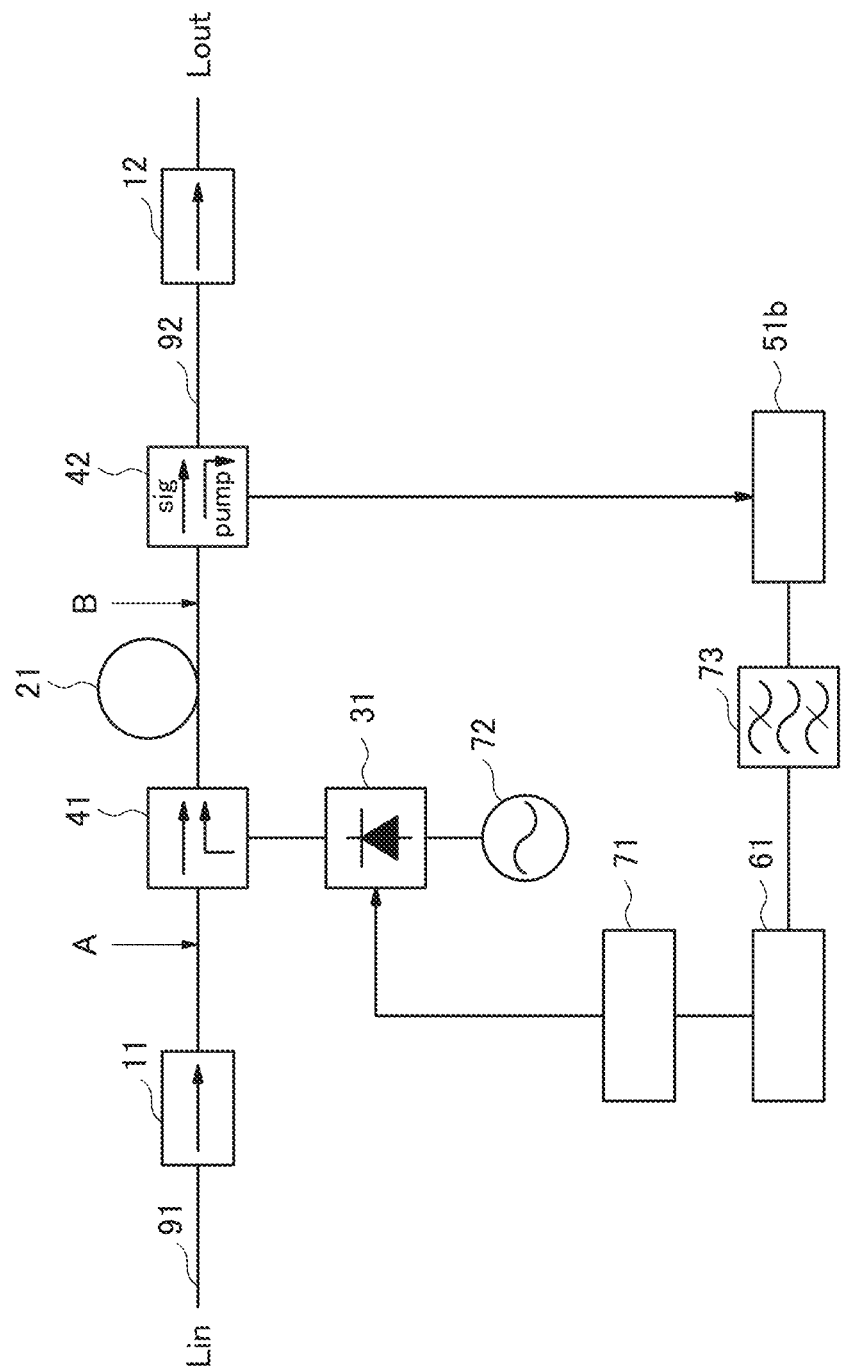
FIG. 8 is a configuration diagram for describing an optical fiber amplifier according to a seventh example embodiment.

Further, another modified example according to the example embodiment is described. FIG. 8 is a block diagram illustrating a configuration example of an optical fiber amplifier according to a seventh example embodiment, enabling to detect, with high sensitivity, residual light by eliminating a natural-emission-light noise component existing in a periphery of a pumping light wavelength. A component similar to a component described according to the first example embodiment and the like is assigned with the same reference sign and description thereof is omitted.

The optical fiber amplifier according to the seventh example embodiment includes, in addition to the components included in the optical fiber amplifier according to the first example embodiment, a dither-signal application unit 72 and a bandpass filter 73. The dither-signal application unit 72 is connected to a pumping light source 31. Output of an optical splitting unit 42 is connected to input of a pumping light intensity monitor 51b, and output of the pumping light intensity monitor 51b is connected to input of the bandpass filter 73.

Next, the dither-signal application unit 72 and the bandpass filter 73 are described. The dither-signal application unit 72 applies sine-wave modulation to the pumping light source 31. It is assumed that in this modulation, a high frequency is used and is sufficiently faster than a response time of a multicore optical fiber 21, and does not cause degradation of signal light due to modulation. The bandpass filter 73 is a filter that transmits only a dither frequency of a pumping light source applied by the dither-signal application unit 72.

Next, an example of an operation of the optical fiber amplifier according to the seventh example embodiment is described. Also, according to the seventh example embodiment, similarly to the first example embodiment, an optical multiplexer 41 causes pumping-light output from an output terminal of an optical multiplexer/demultiplexer to be combined with an optical signal Lin.

Figure 11:
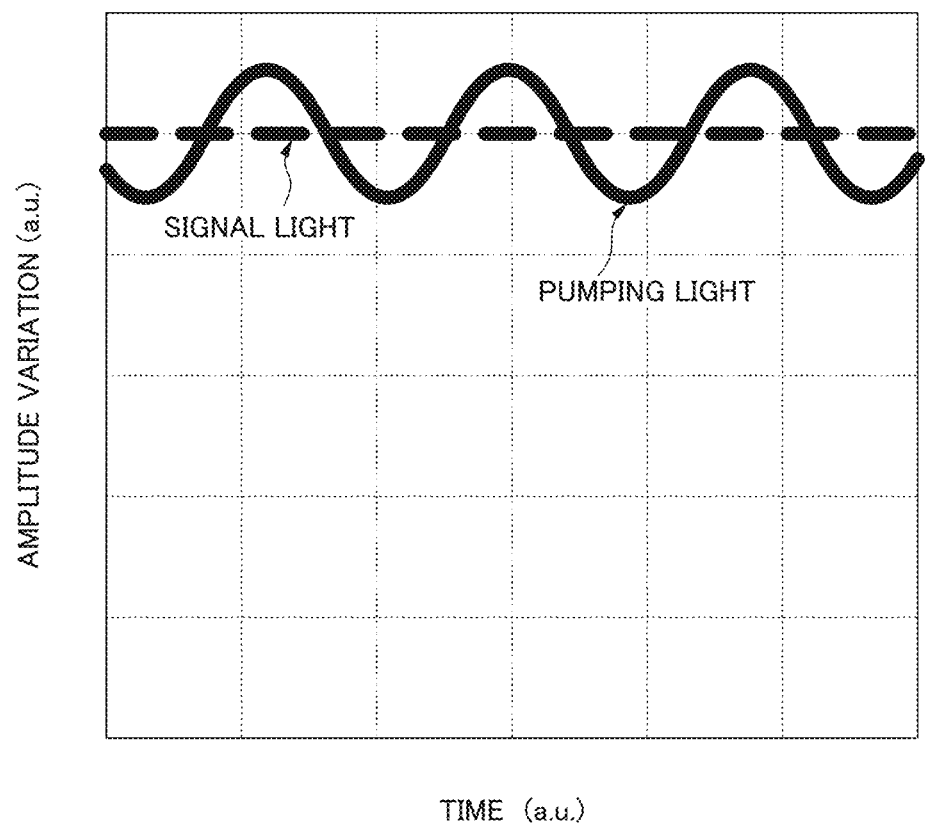
FIG. 11 is a graph describing an influence on signal light quality according to an example embodiment.

However, according to the seventh example embodiment, pumping light to be combined with an optical signal Lin is loaded with a tone of a dither frequency. Pumping light loaded with a tone passes through a range doped with rare earth ions (erbium ions in the present example) in the multicore optical fiber 21, and thereby a signal intensity of an optical signal Lin is amplified. At that time, the pumping light source 31 is modulated by the dither-signal application unit 72. However, a modulation frequency to be applied is, for example, approximately 10 kHz and is sufficiently faster than a response time of the multicore optical fiber 21, and therefore signal light passing through the multicore optical fiber 21 is not modulated. Therefore, quality degradation of signal light does not occur. This situation is illustrated in FIG. 11.

A form in which a modulation signal from the dither-signal application unit 72 is applied to the pumping light source 31 may be a direct modulation method of modulating drive current of the pumping light source 31 or may be an external modulation method of modulating pumping-light output from the pumping light source 31 by using a modulator provided separately from a pumping light source.

Residual pumping light passing through the multicore optical fiber 21 is split from signal light Lout by the optical splitting unit 42 and is converted into an electric signal by the pumping light intensity monitor 51b. The bandpass filter 73 transmits only a dither frequency component of the electric signal after photoelectric conversion.

The pumping light intensity monitor 51b monitors only a dither frequency component of residual pumping light by using a method such as performing square detection on a dither frequency component of residual pumping light, or taking an absolute value and the like.

Figure 12:
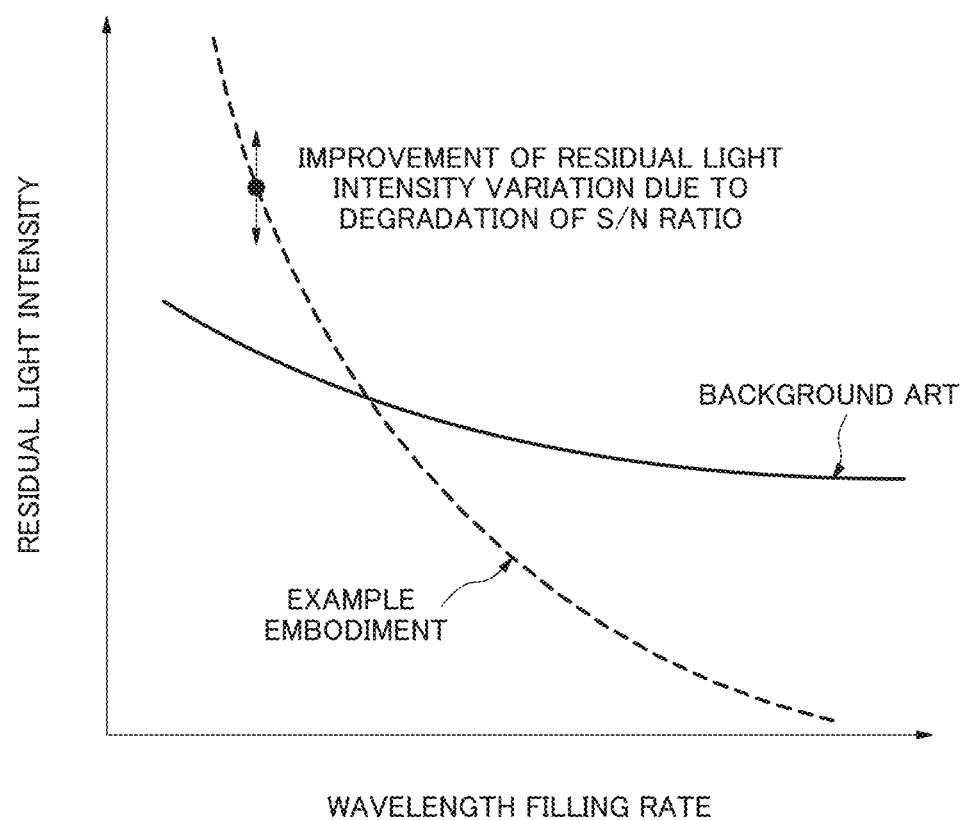
FIG. 12 is a graph describing an advantageous effect of increasing detection accuracy according to an example embodiment.

According to the present example embodiment, without modulation of a main signal, a natural-emission-light noise component existing in a periphery of a pumping light wavelength can be eliminated, and a ratio of an signal light intensity to noise of pumping light is increased, and thereby residual light can be detected with high sensitivity. As a result, accuracy when a band of signal light is calculated from residual pumping light is increased. An advantageous effect of increasing detection accuracy according to the present example embodiment is illustrated in FIG. 12.

Eighth Example Embodiment

Figure 9:
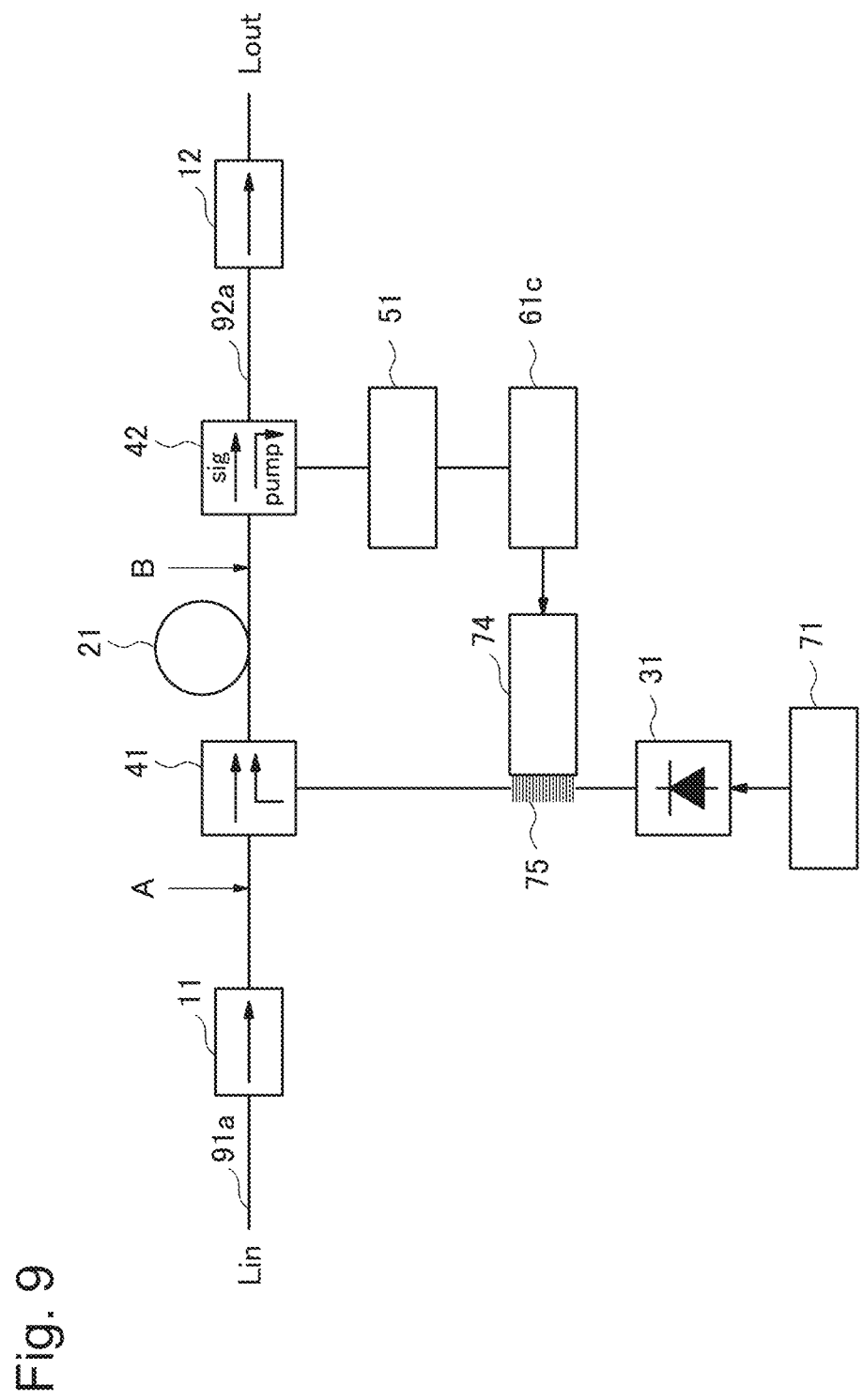
FIG. 9 is a configuration diagram for describing an optical fiber amplifier according to an eighth example embodiment.

Still another modified example according to the example embodiment is described. FIG. 9 is a block diagram illustrating a configuration example of an optical fiber amplifier according to an eighth example embodiment, and a pumping light wavelength is controlled in such a way as to match an absorption band of an optical fiber and thereby a low-power-consumption operation of an amplifier module is made possible. A component similar to a component described according to the first example embodiment is assigned with the same reference sign and description thereof is omitted.

The optical fiber amplifier according to the eighth example embodiment includes, in addition to the components included in the optical fiber amplifier according to the first example embodiment, a heater 74 and a fiber Bragg grating 75. The light-source-drive-circuit control device 61 according to the first example embodiment is replaced with a heater control device 61c.

Next, the heater control device 61c, the heater 74, and the fiber Bragg grating 75 are described. The heater control device 61c is notified of an electric signal relating to an intensity of residual pumping light from a pumping-light intensity monitor 51. In response thereto, the heater control device 61c drives the heater 74. The heater 74 is a device that heats or cools the fiber Bragg grating 75. The fiber Bragg grating 75 is a fiber-type device in which a reflection index of a core of an optical fiber is formed with a periodical refraction index change, and is a device including a function as an optical filter since a transmission wavelength is shifted in proportion to a distortion amount and a temperature change. However, a device in which a transmission wavelength is shifted in proportion to a distortion amount and a temperature change may be a device other than a fiber Bragg grating. A device that controls a transmission wavelength of the fiber Bragg grating 75 is not limited to the heater 74 in FIG. 9 and may be a device other than the heater 74.

Next, an example of an operation of the optical fiber amplifier according to the eighth example embodiment is described. Also, according to the eighth example embodiment, similarly to the first example embodiment, an optical multiplexer 41 causes pumping-light output from an output terminal of an optical multiplexer/demultiplexer to be combined with an optical signal Lin. The optical signal Lin combined with the pumping light passes through a multicore optical fiber 21 and thereby a signal intensity of the optical signal Lin is amplified. The amplified optical signal Lin is output as an optical signal Lout.

At that time, an optical splitting unit 42 splits residual pumping light propagating together with the optical signal Lout in an optical fiber 92a. The pumping-light intensity monitor 51 notifies the heater control device 61c of an intensity of pumping light. The heater control device 61c confirms, based on the signal intensity notified from the pumping light intensity monitor 51, that an intensity of residual pumping light is a predetermined intensity (minimum intensity). When the intensity of residual pumping light is not the predetermined intensity, the heater control device 61c controls the heater 74 in such a way as to achieve a predetermined value and controls a transmission wavelength of a fiber Bragg grating.

According to the present example embodiment, when an absorption band of the multicore optical fiber 21 is narrow and it is necessary to accurately control a wavelength in such a way as to match the absorption band, the fiber Bragg grating 75 is controlled in such a way as to minimize an intensity of residual light, and a pumping light wavelength is controlled. Thereby, pumping light absorption efficiency in the multicore optical fiber 21 is increased, and a low-power-consumption operation of an amplifier module is made possible.

Other Example Embodiments

While desirable example embodiments of the present invention and modified examples according to the example embodiment have been described, the present invention is not limited thereto. According to the above-described example embodiments, description has been made on a case where, for example, the optical multiplexer 41 is provided in a range doped with erbium ions and the optical splitting unit 42 is provided outside the range doped with erbium ions, but the present invention is not limited thereto. Either or both of the optical multiplexer 41 or/and the optical splitting unit 42 may be configured to be provided outside a range doped with erbium ions in the multicore optical fiber 21. According to the above-described example embodiments, while a case where the optical multiplexer 41 causes pumping light to be combined with an optical signal Lin in a form of forward pumping in which the pumping light is directed to the same direction as a propagation direction of signal light has been mainly described, the present invention is not limited to this case. For example, as illustrated in FIG. 6 described as the fifth example embodiment, the optical multiplexer 41a may cause pumping light to be combined with an optical signal Lin in a form of backward pumping in which the pumping light is directed to an opposite direction to a propagation direction of signal light. In other words, the optical splitting unit 42a is provided on an upstream side from the optical multiplexer 41. The optical multiplexer 41a causes, in such a way as to propagate pumping-light output from the pumping light source 31 to an upstream side, the pumping light to be combined with an optical signal Lin. According to the above-described example embodiments, a case where propagation directions of beams of signal light in the multicore optical fiber 21 are the same direction has been described. Directions of beams of signal light propagating in the multicore optical fiber 21 may be opposite directions of an upstream and a downstream. The present invention may be subjected to various modifications without departing from the scope of the invention described in the claims, and it should be understood that these modifications are included in the scope of the present invention.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-42743, filed on Mar. 9, 2018, the disclosure of which is incorporated herein in its entirety by reference.

REFERENCE SIGNS LIST

11, 111 to 11N, 12, 121 to 12N Optical isolator
21 Multicore optical fiber
31 Pumping light source
321 to 32N Core-individual-pumping light source
41 Optical multiplexer
42, 42a Optical splitting unit
431 to 43N Optical multiplexer
44 Core-propagation-pumping light splitting unit
51 Pumping light intensity monitor
51a Core-propagation-pumping light intensity monitor
51b Pumping light intensity monitor
61 Light-source-drive-circuit control device
61a Light-source-drive-circuit control device
61b Optical-multiplexer/demultiplexer-drive control device
61c Heater control device
62 Optimum-ratio storage device
71 Light-source drive circuit
81 Fiber bundle fan-out
82 Fiber bundle fan-in
91a, 92a Optical fiber
911 to 91N Single-core fiber
921 to 92N Single-core fiber

The invention claimed is:

1. An optical fiber amplifier comprising:
   an optical fiber that is supplied with pumping light, amplifies an optical signal, and includes a plurality of cores in a clad;
   a light source that outputs the pumping light;
   a combiner that supplies the pumping light from the light source to the clad in the optical fiber and that causes the pumping light to be combined with the optical signal;
   a collector that collects the pumping light that is supplied to the optical fiber but that is not absorbed by the optical fiber, without collecting the optical signal;
   a monitor that monitors a modulation frequency component of the pumping light that has been collected by the collector and that has passed through the optical fiber; and
   a controller that controls a state of the pumping light, wherein
   the pumping light is modulated at a frequency higher than a response time of the optical fiber.

2. The optical fiber amplifier according to claim 1, wherein
   the pumping light is supplied to the clad in the optical fiber, such that the optical signal in the cores of the optical fiber is collectively amplified.

3. The optical fiber amplifier according to claim 1, wherein
   the state of the pumping light is controlled in that an output intensity of the pumping light is controlled.

4. An optical fiber amplifier comprising:
   an optical fiber that is supplied with pumping light, amplifies an optical signal, and includes a plurality of cores in a clad;
   a light source that outputs the pumping light;
   a combiner that supplies the pumping light from the light source to the clad in the optical fiber and that causes the pumping light to be combined with the optical signal;
   a collector that collects the pumping light that is supplied to the optical fiber but that is not absorbed by the optical fiber, without collecting the optical signal;
   a monitor that monitors the pumping light that has been collected by the collector and that has passed through the optical fiber; and
   a controller that controls a state of the pumping light in that a wavelength of the pumping light is controlled.

5. The optical fiber amplifier according to claim 1, wherein the optical fiber is a first optical fiber, the combiner is a first combiner, and the optical fiber amplifier further comprises:
   a plurality of optical fibers including the first optical fiber;
   a plurality of combiners respectively for the plurality of optical fibers, the plurality of combiners including the first combiner the first optical fiber; and
   a pumping light splitter including output terminals for each of the plurality of combiners, wherein
   the optical fiber amplifier distributes, according to a monitor value, output from one or more light sources.

6. The optical fiber amplifier according to claim 1, further comprising:
   a second light source that outputs the pumping light;
   a second combiner; and
   a second collector that collects, the pumping light that is not absorbed by the optical amplifier, without collecting the optical signal.

7. A transmission system comprising:
   an optical transmission path; and
   the optical fiber amplifier according to claim 1, inserted in the optical transmission path.

8. A control method for an optical fiber amplifier, comprising:
   supplying pumping light from a light source to a clad in an optical fiber that is supplied with the pumping light, the optical fiber amplifying an optical signal, the optical fiber including a plurality of cores in the clad;
   causing the pumping light to be combined with the optical signal;

collecting the pumping light that is supplied to the optical fiber but that is not absorbed by the optical fiber, without collecting the optical signal;

monitoring a modulation frequency component of the pumping light that has been collected and that has passed through the optical fiber;

controlling a state of the pumping light according to a monitoring result; and modulating the pumping light at a frequency higher than a response time of the optical fiber.

9. The control method for the optical fiber amplifier according to claim 8, further comprising supplying the pumping light to the clad in the optical fiber such that the optical signal in cores of the optical fiber is collectively amplified.

10. The control method for the optical fiber amplifier according to claim 8, wherein the state of the pumping light is controlled in that an output intensity of the pumping light is controlled.

11. The control method for the optical fiber amplifier according to claim 8, wherein the state of the pumping light is controlled in that a wavelength of the pumping light is controlled.

* * * * *